United States Patent [19]

Douglas et al.

[11] Patent Number: 4,603,043
[45] Date of Patent: Jul. 29, 1986

[54] CONTROLLABLE NITRATE FUSION

[75] Inventors: Alan D. Douglas; Kenneth T. Reilly, both of Towanda; John E. Landmesser, Monroeton, all of Pa.

[73] Assignee: GTE Products Corporation, Stamford, Conn.

[21] Appl. No.: 707,253

[22] Filed: Mar. 1, 1985

[51] Int. Cl.⁴ .............................................. C01G 41/00
[52] U.S. Cl. ...................................... 423/593; 423/61
[58] Field of Search ............................. 423/53, 61, 593

[56] References Cited

U.S. PATENT DOCUMENTS 1,255,144  2/1918  Ekeley et al. ........................ 423/53
1,652,646  12/1927  Stoddard et al. ..................... 423/61
2,501,952  3/1950  Maier ................................... 423/53

FOREIGN PATENT DOCUMENTS 189873  12/1922  United Kingdom ................. 423/61

Primary Examiner—H. T. Carter
Attorney, Agent, or Firm—Robert E. Walter

[57] ABSTRACT

A process for converting tungsten bearing material to sodium tungstate by adding an oxidizing reactant in small increments to a heated mixture of fused sodium hydroxide and the tungsten bearing material while the temperature is maintained at from about 500° C. to about 700° C.

3 Claims, No Drawings

CONTROLLABLE NITRATE FUSION

FIELD OF THE INVENTION

This invention relates to a process for converting tungsten bearing material to sodium tungstate in which oxidizing reactant is added in small increments to a heated mixture of fused sodium hydroxide and the tungsten bearing material while the temperature is maintained at from about 500° C. to about 700° C.

BACKGROUND OF THE INVENTION

The old method of converting tungsten bearing material to sodium tungstate by means of an oxidizing fusion consists of melting the entire batch requirement of sodium nitrate and other materials together at one time, and gradually adding the tungsten bearing material to control the reaction rate until all the tungsten bearing material has been added and reacted. The fused mixture now containing sodium tungstate is then poured out into a suitable container for solidification or may be poured directly into water. Subsequent operations include removal, breakup, dissolution of the fusion cake in water, and further chemical processing. This method is used for both tungsten metal and tungsten carbide bearing material.

An alternate method is used for tungsten carbide containing material in which all the reactants are mixed together, and the reaction is initiated at one place by heating with a torch to form a localized melt. The reaction that results produces enough heat to cause the molten area and the reaction to spread to the entire batch without any further application of heat. The reaction rate is controlled by incorporating into the mixture either a sufficient quantity of "hard" tungsten carbide bearing material, which is slow to react, or sodium carbonate which dilutes the reactants and absorbs part of the heat produced by the reaction. Before the reaction mass cools and starts to solidify, it is poured out of the fusion vessel into a tray-type container for it to solidify into a relatively thin sheet.

These techniques have disadvantages since controlling the reaction rate is difficult. In an uncontrolled reaction, a large part of the molten mixture may expand due to rapid gas generation and overflow the fusion vessel. This problem arises primarily because of the thermal decomposition characteristics of the sodium nitrate or sodium nitrite in the fused mixture. All or part of the free oxygen is consumed in oxidation of the tungsten material depending on the composition and on the presence of other compounds. This oxidation is highly exothermic, producing enough heat to cause a rapid temperature rise in the fused mixture under certain conditions. A higher temperature causes the sodium nitrate to decompose more rapidly, leading to a rapid generation of nitrogen and oxygen, and, if sodium hydroxide is present, water vapor. These gases must be released to the atmosphere, but if they are generated too rapidly they push the fusion mixture out of the vessel.

Various methods of controlling the rapid generation of gases have been attempted with varying degrees of success or uncertainty. Even adding tungsten bearing material to the fused mixture at a rate to limit the reaction result in the rapid generation of gases described above.

The method of blending the entire charge of tungsten bearing material with sodium hydroxide and sodium nitrate (or sodium nitrite) relies on dilution with either tungsten bearing material or with sodium carbonate or both to moderate the rate. Sodium carbonate is undesirable because it raises the melting point of the mixture. If an excess is present, a higher temperature of the final mixture is required so it can be poured out of the fusion vessel, or else a larger amount of sodium hydroxide must be added to keep the melting point low enough for pouring. Controlling the reaction is also difficult due to variation in the charge of tungsten bearing material. There can be variations in the composition, surface area, or surface activity of the tungsten bearing material. This introduces uncertainty for each batch as to the rate of reaction. It is very difficult to control a rapid reaction.

Heretofore, prior processes for converting tungsten bearing material to sodium tungstate by a fusion of the mixture containing the entire batch charge of oxidizing reactant resulted in a reaction that is difficult to control.

SUMMARY OF THE INVENTION

The present invention converts the tungsten bearing material to sodium tungstate to avoid unstable reacting conditions.

In accordance with the present invention, there is provided a process for converting tungsten bearing material to sodium tungstate comprising forming a mixture of fused sodium hydroxide and the tungsten bearing material, heating the mixture to a temperature of from about 500° C. to about 700° C., maintaining the temperature range while adding an oxidizing reactant in small increments to the mixture to convert appreciably all of the tungsten values to sodium tungstate.

DETAILED DESCRIPTION OF THE INVENTION

The tungsten bearing material can be any material containing tungsten. Preferably scrap tungsten carbide or tungsten metal is used. The scrap is added to the fused NaOH in any convenient manner. Generally the addition is rapid. Scrap in the form of solid pieces or even powder can be placed into the fusion pot from a drum, pail or other container. Wire scrap may have to be handled differently depending on its condition. If the wire has been randomly added to the scrap container in various sizes and lengths, it may be desirable to compress the wire prior to addition. Since there is no chemical reaction of fused NaOH with tungsten there is no problem of safety in adding it as rapidly as possible. The entire charge of material is added to sodium hydroxide which has been fused prior to adding the oxidizing reactant.

The sodium hydroxide is necessary to provide the caustic requirement for conversion of the tungsten to sodium tungstate. The mixture is then heated at a temperature sufficient to melt the material. Generally temperatures are from about 318° C. to about 600° C. with from about 550° C. to about 650° C. being preferred. The most economical procedure is to start with NaOH pellets, flakes, or other solid form, and then heat the fusion pot to the melting point, about 318° C. 50% aqueous solution of NaOH could be used if necessary, but the water content would have to be evaporated off by boiling before the pure NaOH could then be melted and used in the process. Scrap is added to the NaOH after it has melted, generally a temperature between 318° C. and 600° C. Temperature is not critical. There are several reasons for using NaOH:

(a) By providing sodium ion sodium tungstate is formed, and this fits into our tungsten plant operation in which sodium tungstate is either an intermediate, or an end product.

(b) NaOH has a low melting point (318° C.) and thus produces a pourable mixture at the end of the reaction period at a lower temperature than would otherwise be possible.

(c) NaOH serves as a diluent and as a reaction medium for the oxidation reaction. The oxidant is incorporated into the melt as it is added, but is in a diluted form so that the oxidative reaction with tungsten is slower and thus controllable.

The temperature is maintained in the above range throughout the course of the reaction. The oxidizing reactant is next then added in small increments to the fused mixture. Preferred oxidizing reactants are sodium nitrate, sodium nitrite, sodium chlorate, and sodium peroxide. The preferred oxidizing reactant is sodium nitrate. When sodium nitrate is used, the total amount of sodium nitrate for a batch can be in the range of 0.55 lbs to 0.70 lbs. per lb. of tungsten scrap, but preferably about 0.58 to 0.62 lbs. per lb. of tungsten. However, for tungsten carbide scrap, sodium nitrate in the range 0.86 lbs. to 1.0 lb. per lb. of carbide can be used for the WC contact, plus additional amounts for any cobalt content, etc. The amount of each increment and the rate of addition is adjusted according to the rate and vigorousness of the reaction. The heat of reaction is generally sufficient to maintain the required temperature without any further application of heat until the entire charge of reactant has been added. For example, for a batch of about 100 pounds of tungsten metal bearing material, additions of about 1 or 2 pounds of sodium nitrate have been effective in controlling the reaction. The interval of addition of the oxidizing reactant can be judged by observing the indicator of a temperature recorder. When the temperature starts to drop, another addition can be made. After the entire batch charge of oxidizing reactant has been added to the fused mixture, the temperature is maintained in the same temperature range, or preferably in the upper part of this range, for example from about 500° C. to about 620° C., for a period of time sufficient to complete all reaction. At that time there is no further evolution of gas. The fusion mixture is then poured out as usual, and processed according to conventional methods.

The advantage of this invention over the previously discussed methods of converting tungsten from tungsten bearing material to sodium tungstate with an oxidizing fusion is its safety and controllability. Another advantage is that a minimum amount of sodium carbonate is present in the fusion mixture of carbides, since no extra sodium carbonate is added to reduce the reaction rate. In the case of tungsten metal bearing material, no sodium carbonate is produced and none need be added, so the final mixture content is zero. The presence of sodium carbonate is undesirable for the reasons given earlier.

There are differences in the reaction rate depending on the chemical composition and the physical form of the starting material, therefore, the rate of addition of the oxidizing reactant must be adjusted accordingly. In the case of loose wire it may not be possible to charge the entire batch of material at one time because its volume can be too large. In this event only part of the wire is charged and the oxidizing reactant additions are started. However, as soon as part of the wire is reacted, more of the wire charge is added to prevent a build-up of oxidizing reactant in the fused mixture. A steel rod or hoe is used to push the wire to the bottom of the fusion vessel and more wire is added so that the top part of it extends above the surface of the fused mixture. Then more oxidizing reactant can be added safely. Material is added in this way as often as possible until the entire charge has been added.

An alternate procedure is to use a continuous type feeder of any number of standard designs to feed the oxidizing reactant into the fusion vessel. The feed rate can be adjusted to maintain a reasonable and safe reaction rate, and provision can be made automatically to interrupt the feed completely should the temperature of the fusion mixture rise above a pre-set value, or should it rise at a higher rate than a pre-determined safe and desirable rate. In this case of incremental additions of loose wire, as described above, the continuous oxidizing reactant feeder can be controlled manually.

EXAMPLE about 115 lbs. of NaOH flake was charged to a fusion kettle. A gas burner was used to heat the NaOH to 590° C. About 100 lbs. of tungsten wire scrap was added in 1 hr. 40 min. A total of 60 lbs. of sodium nitrate was slowly added in one or two pound increments. Sodium nitrate addition continued for about 3 hours with the melt temperature in the range 565° C. to 620° C. Temperature was maintained in the range 590° C. to 640° C. for an additional 2 hrs. to allow all reaction to be completed. After this the batch was poured into a steel tray and cooled.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for converting tungsten containing material to sodium tungstate, said process comprising:
   (a) forming a mixture of fused sodium hydroxide and said tungsten bearing material,
   (b) heating said mixture to a temperature of from about 500° C. to about 700° C.,
   (c) maintaining said temperature at from about 500° C. to about 700° C. and,
   (d) adding to said heated mixture an sodium nitrate as oxidizing reactant in small increments to convert appreciably all of the tungsten values to sodium tungstate.

2. A process according to claim 1 wherein said temperature is from about 550° C. to about 650° C.

3. A process according to claim 1 wherein said tungsten bearing material is selected from the group consisting of tungsten carbide and tungsten metal.

* * * * *